(12) United States Patent
Lee et al.

(10) Patent No.: US 7,423,072 B2
(45) Date of Patent: *Sep. 9, 2008

(54) WEATHER RESISTANT, INK JETTABLE, RADIATION CURABLE, FLUID COMPOSITIONS PARTICULARLY SUITABLE FOR OUTDOOR APPLICATIONS

(75) Inventors: Jennifer L. Lee, Eagan, MN (US); Ronald K. Thery, New Brighton, MN (US); Caroline M. Ylitalo, Stillwater, MN (US); Richard L. Severance, Stillwater, MN (US); Dong Wu, Woodbury, MN (US); Bruce A. Nerad, Oakdale, MN (US); Verna J. LeMire, White Bear Lake, MN (US); James G. Carlson, Lake Elmo, MN (US); William J. Hunt, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/008,235

(22) Filed: Nov. 7, 2001

(65) Prior Publication Data

US 2002/0086914 A1 Jul. 4, 2002

Related U.S. Application Data

(63) Continuation-in-part of application No. 09/711,336, filed on Nov. 9, 2000, now abandoned.

(51) Int. Cl.
*C09D 11/02* (2006.01)
*C09D 11/10* (2006.01)

(52) U.S. Cl. .......... 522/96; 522/107; 522/114; 522/120; 522/121; 522/167; 522/168; 522/182; 522/183

(58) Field of Classification Search .......... 522/96, 522/107, 114, 120, 121, 167, 168, 182, 183; 523/160
See application file for complete search history.

(56) References Cited

U.S. PATENT DOCUMENTS

| | | | |
|---|---|---|---|
| 3,953,214 A | 4/1976 | Lipson | 96/115 P |
| 4,228,438 A | 10/1980 | Vazirani | 346/1.1 |
| 4,303,924 A | 12/1981 | Young, Jr. | 346/1.1 |
| 4,978,969 A | 12/1990 | Chieng | 346/1.1 |
| 5,376,169 A | 12/1994 | Hotomi et al. | 106/23 C |
| 5,641,346 A | 6/1997 | Mantell et al. | 106/31.58 |
| 5,670,005 A | 9/1997 | Look et al. | |
| 5,721,086 A | 2/1998 | Emslander et al. | |
| 5,981,113 A | 11/1999 | Christian | |
| 6,114,406 A * | 9/2000 | Caiger et al. | 522/121 |
| 6,326,419 B1 * | 12/2001 | Smith | 523/160 |
| 6,534,128 B1 * | 3/2003 | Carlson et al. | 427/466 |
| 6,558,753 B1 * | 5/2003 | Ylitalo et al. | 427/466 |

FOREIGN PATENT DOCUMENTS

| | | |
|---|---|---|
| EP | 0 407 054 A1 | 1/1991 |
| EP | 0 187 045 B1 | 7/1991 |
| EP | 590 889 A2 | 4/1994 |
| EP | 0 465 039 B1 | 1/1995 |
| EP | 658 607 A1 | 6/1995 |
| EP | 0 882 104 B1 | 10/1999 |
| EP | 0 842 051 B1 | 2/2000 |
| EP | 0 659 039 B1 | 3/2000 |
| EP | 0 997 508 A1 | 5/2000 |
| JP | 60132767 | 7/1985 |
| JP | 63235382 | 9/1988 |
| JP | 1133746 | 5/1989 |
| JP | 2283452 | 11/1990 |
| JP | 2311569 | 12/1990 |
| JP | 3216379 | 9/1991 |
| JP | 50 09259 A | 1/1993 |
| JP | 53 20287 A | 12/1993 |
| JP | 9-183929 | 7/1997 |
| JP | 2001-207098 | 7/2001 |
| JP | 2001-322349 | 11/2001 |
| JP | 2001-300188 | 7/2002 |
| WO | WO 89/07878 | 8/1989 |
| WO | WO 91/17302 | 11/1991 |
| WO | WO 97/31071 | 8/1997 |
| WO | WO 98/16590 | 4/1998 |
| WO | WO 98/27171 * | 6/1998 |
| WO | WO 98/55900 | 12/1998 |
| WO | WO 99/06888 | 2/1999 |
| WO | WO 99/19900 | 4/1999 |
| WO | WO 99/29787 | 6/1999 |
| WO | WO 99/29788 * | 6/1999 |
| WO | WO 99/54416 | 10/1999 |

* cited by examiner

*Primary Examiner*—Susan W Berman
(74) *Attorney, Agent, or Firm*—Colene H. Blank

(57) ABSTRACT

Low viscosity, radiation curable fluid formulations that can be used advantageously as radiation curable, inks. The formulations are easily prepared for use in ink jet systems. The viscosity of the compositions is low enough so that conventional solvent is not required in order to satisfy the requisite low ink jet viscosity specifications. After curing, the compositions form durable, weatherable, abrasion resistant, printed images on a wide variety of porous and nonporous substrates. The formulations are very suitable for outdoor printing applications, especially for printing outdoor graphics onto a variety of surfaces, including vinyl or other polymer films commonly used for signage, retroreflective signage or other retroreflective items.

27 Claims, No Drawings

WEATHER RESISTANT, INK JETTABLE, RADIATION CURABLE, FLUID COMPOSITIONS PARTICULARLY SUITABLE FOR OUTDOOR APPLICATIONS

RELATED APPLICATIONS

This application is a continuation-in-part of U.S. patent application Ser. No. 09/711,336 filed Nov. 9, 2000, now abandoned.

FIELD OF THE INVENTION

The present invention relates to weather resistant, ink jettable, radiation curable, fluid compositions incorporating a radiation curable diluent, an oligo/resin, and optional additives such as colorants, photoinitiators, and the like. The compositions are particularly well-suited for forming ink jetted, radiation cured printed features on outdoor substrates such as signs, roadways, motor vehicles, boats, aircraft, furniture, equipment, and the like.

BACKGROUND OF THE INVENTION

Inkjet imaging techniques have become very popular in commercial and consumer applications. Ink jet printers operate by ejecting ink onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers are capable of forming not just printed features on a wide variety of substrates, including not just flat films or sheets, but also three-dimensional objects as well.

Thermal ink jet printers and piezo inkjet printers are the two main types of ink jet systems in widespread use today. For both approaches, inks must meet stringent performance requirements in order for the inks to be appropriately jettable and for the resultant printed features to have the desired mechanical, chemical, visual, and durability characteristics. In particular, inks must have relatively low viscosity when jetted, yet must be able to form accurate, durable images on the desired receiving substrate. For example, a typical ink for thermal ink jetting must typically have a viscosity in the range of 3 to 5 centipoise at 25° C., while piezo inks must typically have a viscosity in the range of 3 to 30 centipoise at the jetting temperature. The need to use low viscosity inks makes it challenging to obtain printed features with good mechanical, chemical, visual, and durability characteristics.

Solvent-based and water-based jettable inks are well known. A typical water-based ink generally comprises water, a colorant, which may be a dye and/or a pigment, one or more co-solvents, and one or more additives that are included to enhance the performance of the ink. Representative examples of such additives include one or more colorants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Water-based inks have drawbacks. For industrial applications, drying is energy and equipment intensive. Drying water also takes time, and the printed material needs to be handled carefully during the relatively lengthy drying period. Water-based inks are also compatible only with a limited range of substrates, typically those on which the water is absorbed to some degree. Images formed using water-based inks typically require a protective overlaminate for outdoor applications.

Instead of water, other solvent-based inks include relatively volatile, inorganic solvents. Such inks dry more rapidly and easily than aqueous inks. However, such solvents may be toxic, flammable, or the like, requiring careful handling. These inks also tend to be compatible with only a limited range of substrates.

In order to avoid using a conventional solvent, ink compositions incorporating a free radically polymerizable diluent have been developed. The diluent not only functions as a solvent, but also functions as a viscosity reducer, as a binder when cured, and optionally as a crosslinking agent. In the uncured state, these compositions have a low viscosity and are readily jetted. However, the polymerizable monomers readily crosslink upon exposure to a suitable source of curing energy, e.g., ultraviolet light, electron beam energy, and/or the like, to form a crosslinked polymer network. Depending upon the kind of monomers incorporated into the diluent, the resultant network may provide the printed features with durability, flexibility, elasticity, gloss, hardness, chemical resistance, stiffness, combinations of these, and the like.

Conventional inks formed from radiation polymerizable monomers have some drawbacks. First, printed features formed from these materials might have a tendency to shrink when cured. Further, the adhesion, weatherability, resilience, toughness, flexibility, dot gain, and the like also may not be as good as is desired, particularly for outdoor signage applications.

SUMMARY OF THE INVENTION

The present invention provides low viscosity, radiation curable fluid formulations that can be used advantageously as radiation curable inks. The formulations are easily prepared for use in ink jet systems. The viscosity of the compositions is low enough so that conventional solvent is not required in order to satisfy the requisite low ink jet viscosity specifications. After curing, the compositions form durable, weatherable, abrasion resistant, printed images on a wide variety of porous and nonporous substrates. The formulations are very suitable for outdoor printing applications, especially for printing outdoor graphics onto a variety of surfaces, including vinyl or other polymer films commonly used for signage, retroreflective signage or other retroreflective items.

Unlike U.S. Pat. No. 5,670,005 in which the ink layer of retroreflective items is "buried" below the outer surface of such articles to protect the ink and to obtain a desired level of durability, radiation curable inks according to the present invention allow print indicia to be formed on the outer surfaces with exceptional durability.

In short, the radiation curable inkjet inks of the present invention overcome deficiencies in prior inks by simultaneously achieving the desirable ink properties of low viscosity, optimum surface tension for jetting, and cured ink properties of adhesion, weatherability, durability, non-tackiness, gloss, transparency, and abrasion resistance.

In one aspect, the present invention relates to a radiation curable ink composition. The composition includes an oligo/resin component and a radiation curable, reactive diluent. The ink composition has an ink jettable viscosity. The composition comprises:

(i) 0.1 to 50 weight percent of an adhesion promoting, radiation curable component comprising one or more of a heterocyclic, radiation curable monomer and/or an alkoxylated monomer comprising pendant alkoxylated functionality and no main chain alkoxylated functionality and (ii) no more than about 10 weight percent of an optional alkoxylated, radiation curable monomer comprising main-chain alkoxylated functionality.

In another aspect, the present invention relates to a radiation curable, ink jettable fluid composition. The composition includes an oligo/resin component and a radiation curable reactive diluent. The reactive diluent comprises a high Tg component, an adhesion promoting component, and at least one multifunctional monomer having a plurality of radiation curable moieties. The adhesion promoting component includes 0.1 to 50 weight percent of at least one of a radiation curable monomer having heterocyclic functionality and/or a radiation curable monomer with pendant alkoxylated functionality.

In another aspect, the present invention relates to a radiation curable, ink jettable fluid composition. The composition includes an oligo/resin component and a radiation curable reactive diluent. The reactive diluent comprises an adhesion promoting component, said adhesion promoting component comprising an alkoxylated, radiation curable monomer and a radiation curable monomer comprising a heterocyclic moiety.

In another aspect, the present invention relates to a radiation curable, ink jettable fluid composition. The composition includes an oligo/resin component; and a radiation curable reactive diluent. The reactive diluent comprises an adhesion promoting component, a high Tg component, a surface tension lowering component, and a multifunctional monomer having a plurality of radiation curable moieties. The low surface tension component comprises a radiation curable monomer containing a hydrocarbyl moiety of 2 to 20 carbon atoms.

In another aspect, the present invention relates to a radiation curable ink composition. The composition includes an oligo/resin component and a radiation curable, reactive diluent. The ink composition is substantially free of solvent and has an ink jettable viscosity in an uncured state. The ink composition is at least a substantially Newtonian fluid in the uncured state. The ink has an elongation at break when cured of at least 50%.

In another aspect, the present invention relates to a radiation curable ink composition that has an ink jettable viscosity in an uncured state and at least about 50 percent elongation in a cured state. The ink composition comprises an oligo/resin component selected from the group consisting of an aliphatic polyester oligo/resin, an aliphatic polyurethane oligo/resin, and an aliphatic acrylic oligo/resin.

In another aspect, the invention relates to a radiation curable, ink jettable composition comprising tetrahydrofurfuryl (meth)acrylate.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Durable, weather resistant, features such as text, bar codes, graphics, images and/or other indicia may be formed on one or more receiving substrates in one or more desired patterns by applying and then curing fluid composition(s) of the present invention. Preferred embodiments of the present invention are in the form of colored inks or protective clearcoat inks.

Prior to curing, fluid compositions of the present invention preferably have one or more of several desirable features. Firstly, radiation curable compositions of the present invention tend to have sufficiently low viscosity properties so that the fluid compositions advantageously may be applied to receiving substrates using ink jetting techniques. Preferably, fluid compositions of the present invention have a viscosity of below about 30 centipoise, preferably below about 25 centipoise, and more preferably below about 20 centipoise at the desired ink jetting temperature (typically from ambient temperature up to about 65° C.). However, the optimum viscosity characteristics for a particular composition will depend upon the jetting temperature and the type of ink jet system that will be used to apply the composition onto the substrate. For example, for piezo ink jet applications, a typical desired viscosity is about 3 to about 30 centipoise at the print head temperature. Generally, this means that the fluid compositions preferably have a viscosity at 25° C. of up to about 50 centipoise. Particularly preferred embodiments of the fluid compositions described herein tend to have viscosities in this range of 10 to 16 centipoise at moderate temperatures of 25° C. to about 65° C.

Such viscosity characteristics generally help to ensure that the composition will be jettable at the desired print head temperature. Due to potential volatility and reactivity of one or more constituents of radiation curable compositions, the fluid compositions preferably are jetted at temperatures no higher than about 65° C., and more preferably no higher than about 50° C.

As another preferred characteristic that is desirable for ink jetting applications, fluid compositions of the present invention desirably have moderate to low surface tension properties. Preferred formulations have a surface tension in the range of from about 20 dynes/cm to about 50 dynes/cm, more preferably in the range of from about 22 dynes/cm to about 40 dynes/cm at the printhead operating temperature. Most radiation curable, monomeric constituents (hereinafter referred to as the "reactive diluent") to be incorporated into the radiation curable component of the present invention already have surface tension characteristics in the preferred ranges. Therefore, formulating fluid compositions of the present invention with appropriate surface tension characteristics for ink jet applications is easily accomplished.

Preferred fluid compositions of the present invention also have Newtonian or substantially Newtonian viscosity properties. A Newtonian fluid has a viscosity that is at least substantially independent of shear rate. As used herein, the viscosity of a fluid will be deemed to be substantially independent of shear rate, and hence at least substantially Newtonian, if the fluid has a power law index of 0.95 or greater. The power law index of a fluid is given by the expression $$\eta = m\gamma^{n-1}$$

wherein $\eta$ is the shear viscosity, $\gamma$ is the shear rate in $s^{-1}$, m is a constant, and n is the power law index. The principles of the power law index are further described in C. W. Macosko, "Rheology: Principles, Measurements, and Applications", ISBN #1-56081-579-5, page 85.

Newtonian or substantially Newtonian fluid compositions are especially preferred over non-Newtonian fluids that exhibit substantial shear thinning behavior. Typically, substantially shear thinning fluids are elastic. Elasticity of a fluid tends to cause extension thickening behavior, which is known to prevent jetting of inks even when the low viscosity requirement is satisfied. Another reason for using fluids with at least substantially Newtonian viscosity properties is that jetting is typically achieved at shear rates around $1\times10^6$ s$^{-1}$, while ink refill from the reservoir into the ink jet head channels takes place at 100-1000 s$^{-1}$. A highly shear thinning ink will have much higher viscosity at the refill rate than at the jetting rate. This tends to slow refill, compromising printhead performance. Shear thinning fluids can be avoided by formulating fluid compositions that exhibit little or no elasticity. Elasticity is minimized by controlling the amount and weight average molecular weight of oligo/resins incorporated into the fluid composition, by selecting highly branched oligo/resins, and/or by manipulating the solubility of the higher molecular weight species in the formulation. Generally, formulations in which the oligo/resins are more soluble tend to be more elastic than formulations in which the oligo/resins are less soluble.

Compositions of the present invention also preferably have one or more of several desirable features when cured. Firstly, preferred embodiments of the present invention are compatible with an extremely wide variety of porous and nonporous substrates. This is due, at least in part, to the combinations of oligo/resin and monomer(s) of the reactive diluent. The radiation curable fluid compositions also exhibit good adhesion to non-porous substrates, especially those used in retroreflective sheeting top films, when measured according to ASTM D 3359-95A Standard Test Methods for Measuring Adhesion by Tape Test, Method B.

Cured compositions of the present invention may have a wide range of elongation characteristics depending upon the intended use. For example, such compositions may be characterized by an elongation of at least about 1%, preferably at least about 20%, more preferably from more than about 50% to about 300% or more, as desired. Cured compositions with elongation characteristics greater than about 50% are beneficially used to reduce stress cracks, improve toughness, and improve weatherability. In the practice of the present invention, elongation of a cured material refers to the maximum elongation at break determined in accordance with ASTM Test Method D-3759.

Many embodiments of the radiation cured fluids of the present invention, excepting any containing opaque colorants, such as carbon black, titanium dioxide ($TiO_2$), or organic black dye, are transparent when measured according to ASTM 810 Standard Test Method for Coefficient of Retroreflection of Retroreflective Sheeting. That is, when coated onto retroreflective substrates, the visible light striking the surface of such films is transmitted through to the retroreflective sheeting components. This property makes such inks particularly useful for outdoor signing applications, in particular traffic control signing systems. The radiation cured films of these liquid formulations are easily formulated and cured under conditions so as to exhibit tack-free surfaces when cured. This makes the printed images resistant to dirt build-up and the like.

In preferred embodiments, the cured films also resist marring when subjected to moderate abrasion. A useful method for evaluating abrasion resistance is ASTM D 4060, Standard Test Method for Abrasion Resistance of Organic Coatings by Taber Abraser. When monitored by percent retention of gloss or retroreflectivity over the abraded surfaces, the cured films of preferred embodiments show excellent abrasion resistance relative to conventional screen printing ink standards.

The radiation cured films of preferred embodiments also exhibit durability in outdoor applications, particularly when used as a system with retroreflective sheeting. Based upon direct comparison, these films exhibit comparable or improved durability relative to conventional screen printing ink standards.

Preferred radiation curable compositions of the present invention generally incorporate (1) a radiation curable, reactive diluent, (2) one or more oligo/resins, and (3) one or more optional adjuvants that are selected based upon the intended use of the compositions. In the practice of the present invention, "radiation curable" refers to functionality directly or indirectly pendant from a monomer, oligomer, or polymer backbone (as the case may be) that participate in crosslinking reactions upon exposure to a suitable source of curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are preferred. Of these, (meth)acryl moieties are most preferred. The term "(meth)acryl", as used herein, encompasses acryl and/or methacryl.

The energy source used for achieving crosslinking of the radiation curable functionality may be actinic (e.g., radiation having a wavelength in the ultraviolet or visible region of the spectrum), accelerated particles (e.g., electron beam radiation), thermal (e.g., heat or infrared radiation), or the like. Preferably, the energy is actinic radiation or accelerated particles, because such energy provides excellent control over the initiation and rate of crosslinking. Additionally, actinic radiation and accelerated particles can be used for curing at relatively low temperatures. This avoids degrading components that might be sensitive to the relatively high temperatures that might be required to initiate crosslinking of the radiation curable groups when using thermal curing techniques. Suitable sources of actinic radiation include mercury lamps, xenon lamps, carbon arc lamps, tungsten filament lamps, lasers, electron beam energy, sunlight, and the like. Ultraviolet radiation, especially from medium pressure mercury lamps, is most preferred.

As used herein, the term "monomer" means a relatively low molecular weight material (i.e., having a molecular weight less than about 500 g/mole) having one or more polymerizable groups. "Oligomer" means a relatively intermediate molecular weight (i.e., having a molecular weight of from about 500 up to about 100,000 g/mole) material having one or more radiation polymerizable groups. "Polymer" means a molecule comprising a substructure formed from one or more monomeric, oligomeric, and/or polymeric constituents having repeating monomer substructure and that has no further radiation polymerizable groups. The term "molecular weight" as used throughout this specification means number average molecular weight unless expressly noted otherwise.

As used herein, the term "oligo/resin" shall be used to refer collectively to oligomers and polymers. Preferred oligo/resins have a number average molecular weight below about 100,000, preferably from about 500 to about 30,000, and more preferably from about 700 to about 10,000. One or more oligo/resins may be incorporated into fluid compositions of the present invention in order to provide many benefits, including viscosity control, reduced shrinkage upon curing, durability, flexibility, outdoor weatherability, and/or the like. Oligo/resins suitable in the practice of the present invention may be polyurethanes, acrylic materials, polyesters, polyimides, polyamides, epoxies, polystyrene, styrene and substituted styrene containing materials, silicone containing materials, fluorinated materials, combinations of these, and the like. Preferred oligo/resin materials are aliphatic in that aliphatic materials tend to have good weatherability properties.

Optionally, the monomers and/or oligo/resins of the present invention may include functionality to help enhance the performance of the fluid compositions of the present invention. For example, oligomers and/or monomers may include radiation curable functionality to allow these materials to co-react with the reactive diluent upon exposure to a suitable energy source. To allow the monomers and/or oligo/resins to form an interpenetrating polymer network with the reactive diluent, monomers and/or oligo/resins may include a different kind of crosslinking functionality such as pendant hydroxyl groups or the like. In the presence of an isocyanate crosslinking agent, pendant hydroxyl moieties will undergo urethane crosslinking reactions with the NCO groups of the isocyanate crosslinking agent to form a crosslinked network comprising urethane linkages. To help disperse optional additives such as pigment colorants, inorganic powder fillers, and the like, monomers and/or oligo/resins may comprise pendant dispersant moieties, such as acid or salt moieties of sulfonate, phosphate, phosphonate, carboxylate, polar heterocyclic, (meth)acrylonitrile, and/or the like.

For outdoor applications, polyurethane and acrylic-containing oligo/resins are preferred due to the tendency of these materials to have excellent durability and weatherability characteristics. Such materials also tend to be readily soluble in reactive diluents formed from radiation curable, (meth)acrylate functional monomers.

Because aromatic constituents of oligo/resins generally tend to have poor weatherability and/or poor resistance to sunlight, aromatic constituents are preferably limited to less than 5 weight percent, preferably less than 1 weight percent, and more preferably are substantially excluded from both the oligo/resins and the reactive diluents of the present invention. Accordingly, straight-chained, branched and/or cyclic aliphatic and/or heterocyclic ingredients are preferred for forming oligo/resins to be used in outdoor applications.

The oligo/resins themselves may be straight-chained, branched, and/or cyclic. Branched oligo/resins are preferred in that such materials tend to have lower viscosity than straight-chain counterparts of comparable molecular weight. The amount of oligo/resin materials incorporated into fluid compositions of the present invention may vary within a wide range depending upon such factors as the intended use of the resultant composition, the nature of the reactive diluent, the nature of the oligo/resin(s), the weight average molecular weight of the oligo/resins, and the like. As general guidelines ink jettable fluid compositions may include from about 0.1 to about 50 weight percent of oligo/resins, wherein polymer species preferably may comprise from about 0.1 to about 30, preferably from about 5 to about 20 weight percent of the composition. Oligomer species may comprise from about 0.1 to about 50, preferably from about 15 to about 40 weight percent of the composition.

Suitable radiation curable oligo/resins for use in the present invention include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Preferred (meth)acrylated aliphatic urethanes are di(meth)acrylate esters of hydroxy terminated NCO extended aliphatic polyesters or aliphatic polyethers. (Meth)acrylated polyesters are the reaction products of (meth)acrylic acid with an aliphatic dibasic acid/aliphatic diol-based polyester. Examples of commercially available (meth)acrylated urethanes and polyesters include those known by the trade designations PHOTOMER (Henkel Corp. of Hoboken, N.J.).; EBECRYL 284, 810, 4830, 8402, 1290, 1657, 1810, 2001, 2047, 230, 244, 264, 265, 270, 4833, 4835, 4842, 4866, 4883, 657, 770, 80, 81, 811, 812, 83, 830, 8301, 835, 870, 8800, 8803, 8804 (UCB Radcure Inc. of Smyrna, Ga.); SARTOMER CN series CN964 B-85, CN292, CN704, CN816, CN817, CN818, CN929, CN944B-85, CN945A-60, CN945B-85, CN953, CN961, CN962, CN963, CN 965, CN966, CN968, CN980, CN981, CN982, CN983, CN984, CN985 (Sartomer Co. of Exton, Pa.); ACTILANE (Akcross Chemicals of New Brunswick, N.J.); and UVITHANE (Morton International of Chicago, Ill.).

Preferred acrylated acrylics are acrylic oligomers or polymers that have reactive pendant or terminal (meth)acrylic acid groups capable of forming free radicals for subsequent reaction. Examples of commercially available (meth)acrylated acrylics include those known by the trade designations EBECRYL 745, 754, 767, 1701, and 1755 from UCB Radcure Inc., Smyrna, Ga. Other oligo/resin examples include polymers available under the trade designations ELVACITE 2014 (ICI Acrylics, Inc., Wilmington, Del.); JONCRYL 587 (S.C. Johnson, Racine, Wis.); and ACRYLOID B series and PARALOID B series such as PARALOID B-60 (Rohm & Haas Co., Philadelphia, Pa.).

Another particularly preferred class of radiation curable, urethane oligomers are described in Assignee's co-pending U.S. patent application filed concurrently with the present application in the names of James Carlson et al. titled INKS AND OTHER COMPOSITIONS INCORPORATING LOW VISCOSITY, RADIATION CURABLE, POLYESTER URETHANE OLIGOMER and bearing Ser. No. 09/711,346, the entire disclosure of which is incorporated herein by reference. These radiation curable, urethane oligomers are generally characterized by atypically low viscosity characteristics, have a relatively high urethane content, are very economical to manufacture, and are compatible with a wide range of porous and nonporous substrates.

The reactive diluent generally comprises one or more radiation curable monomers. Subject to desired performance standards, any radiation curable monomer or combinations thereof may be incorporated into the reactive diluent. Accordingly, the present invention is not intended to be limited to specific kinds of radiation curable monomers in various aspects so long as any such performance conditions are satisfied. However, for ink jetting applications, such monomers, at least in combination, preferably exist as a liquid of ink jettable viscosity at the desired ink jet head temperature. In addition to radiation curable functionality, the monomers incorporated into the reactive diluent may include other functionality or multiple functionality of the same and/or different type.

The radiation curable monomers of the reactive diluent may be mono-, di-, tri-, tetra- or otherwise multifunctional in terms of radiation curable moieties. These monomers function as diluents or solvents for the oligo/resin component (if any), as viscosity reducers, as binders when cured, and as crosslinking agents. The amount of such monomers to be incorporated into the reactive diluent can vary within a wide range depending upon the intended use of the resultant composition. As general guidelines, the radiation curable component of the present invention may contain from about 25 to about 100, preferably 40 to 90 weight percent of such monomers.

Representative examples of monofunctional, radiation curable monomers suitable for use in the reactive diluent include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional caprolactone ester (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Multifunctional radiation curable materials may also be incorporated into the reactive diluent to enhance one or more properties of the cured film, including crosslink density, hardness, tackiness, mar resistance, or the like. If one or more multifunctional materials are present, the reactive diluent may comprise from 0.5 to about 50, preferably 0.5 to 35, and more preferably from about 0.5 to about 25 weight percent of such materials. Examples of such higher functional, radiation curable monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, combinations of these, and the like.

Preferred radiation curable, reactive diluents of the present invention may be formulated with one or more radiation curable monomers or combinations thereof that help the radiation curable compositions and/or resultant cured compositions to satisfy one or more desirable performance criteria. For example, in order to promote hardness and abrasion resistance of resultant cured material, fluid compositions of the present invention advantageously may incorporate radiation curable monomer(s) (hereinafter "high Tg component") whose presence causes the cured material, or a portion thereof, to have a higher glass transition temperature, Tg, as compared to an otherwise identical material lacking such high Tg component. Preferred monomeric constituents of the high Tg component generally include monomers whose homopolymers have a Tg of at least about 50° C., preferably at least about 60° C., and more preferably at least about 75° C. in the cured state. When used, the high Tg component may constitute 0.5 to 50, preferably 0.5 to 40, more preferably 0.5 to 30 weight percent of the radiation curable, reactive diluent.

An exemplary class of radiation curable monomers that tend to have relatively high Tg characteristics suitable for incorporation into the high Tg component generally comprise at least one radiation curable (meth)acrylate moiety and at least one nonaromatic, alicyclic and/or nonaromatic heterocyclic moiety. Isobornyl (meth)acrylate is a specific example of one such monomer. A cured, homopolymer film formed from isobornyl acrylate, for instance, has a Tg of 88° C. The monomer itself has a molecular weight of 208 g/mole, exists as a clear liquid at room temperature, has a viscosity of 9 centipoise at 25° C., has a surface tension of 31.7 dynes/cm at 25° C., and is an excellent reactive diluent for many kinds of oligo/resins. In the practice of the present invention, Tg of a monomer refers to the glass transition temperature of a cured film of a homopolymer of the monomer, in which Tg is measured by differential scanning calorimetry (DSC) techniques. 1,6-Hexanediol di(meth)acrylate is another example of a monomer with high Tg characteristics.

In order to promote adhesion both before and especially after radiation curing, fluid compositions of the present invention advantageously may incorporate radiation curable monomer(s) (hereinafter "adhesion promoting component") whose presence causes the uncured and/or cured material to have higher adhesion to the desired receiving substrate as compared to an otherwise identical formulation lacking such adhesion promoting component. Preferred monomeric constituents of the adhesion promoting component generally include monomers having an adhesion score of at least about 50, preferably at least about 80, and more preferably at least about 95 on at least one, preferably at least two, substrates chosen from the group consisting of polymethyl methacrylate, polyvinyl chloride, and polyethylene terephthalate. In the practice of the present invention, adhesion score is measured according to ASTM D 3359-95A Standard Test Methods for Measuring Adhesion by Tape Test, Method B. When used, the adhesion promoting component may comprise 0.5 to about 70, preferably 0.5 to about 50, more preferably 0.5 to about 40 weight percent of the reactive diluent.

A wide variety of monomers with adhesion promoting characteristics may be incorporated singly or in combination into the adhesion promoting component of the reactive diluent. Adhesion promoting monomers are those that tend to diffuse into the substrate to form a physical lock when cured. Such monomers have a measurable diffusion coefficient into the substrate of interest. One such class of monomers comprises one or more (meth)acrylate moieties and one or more alkoxy and/or polyalkoxy moieties. These alkoxylated monomers tend to be characterized by good flexibility, low shrinkage, and impact strength when cured. However, the alkoxy or polyalkoxy moieties of such materials may have a tendency to oxidize over time. This could impair the performance of the resultant cured material, particularly if the alkoxylated functionality is situated in the monomer such that such functionality is positioned as part of a main polymer backbone when the compositions of the present invention are cured. These materials also are compatible only with a limited range of nonporous substrates.

Accordingly, it is preferred to use 0.1 to 50 weight percent of alkoxylated monomers with pendant alkoxylated functionality rather than main chain functionality. It is further desirable to limit the use of alkoxylated monomers comprising such main chain alkoxylated functionality, and preferred reactive diluents comprise no more than about 10 weight percent of such alkoxylated monomers. Limiting the use of alkoxylated monomers for which the alkoxylated functionality becomes pendant from a main polymer backbone is generally not required in the practice of the present invention. Oxidation of such pendant alkoxylated functionality has less of an impact upon bulk polymer properties than does oxidation of main chain alkoxylated functionality.

A specific example of one illustrative alkoxylated monomer is 2-(2-ethoxyethoxy)ethyl acrylate. This monomer is a clear liquid at room temperature and has a viscosity of 6 centipoise at 25° C., a surface tension of 32.4 dynes/cm at 25° C., and is slightly polar. A cured film of this monomer has a Tg of −54° C. Others include propoxy ethyl (meth)acrylate, propoxylated neopentyl glycol di(meth)acrylate, and the like.

Propoxylated neopentyl glycol di(meth)acrylate has main chain alkoxylated functionality and is least preferred.

Another class of radiation curable monomers with adhesion promoting characteristics suitable for use in the adhesion promoting component include relatively low Tg monomers comprising at least one heterocyclic moiety and at least one (meth)acrylate moiety. As used herein, low Tg means that a cured homopolymer film of the monomer has a Tg of less than about 40° C., preferably less than about 10° C., and more preferably less than about −10° C. An illustrative embodiment of one such monomer is tetrahydrofurfuryl acrylate. This monomer is an excellent adhesion promoter with respect to many different kinds of porous and nonporous substrates, is a clear liquid at room temperature, has a viscosity of 6 centipoise at 25° C., a surface tension of 36.1 dynes/cm at 25° C., a Tg of −28° C., and a molecular weight of 156 g/mole.

Combinations of monomers with adhesion promoting characteristics are advantageously used to formulate an adhesion promoting component of the present invention. One particularly preferred combination with very good adhesion promoting properties comprises 1 to 10 parts by weight of an alkoxylated (meth)acrylate per 5 to 15 parts by weight of a heterocyclic (meth)acrylate. A particularly preferred embodiment of such a combination comprises 2-(2-ethoxyethoxy)ethyl (meth)acrylate and tetrahydrofurfuryl (meth)acrylate. N-vinylcaprolactam also promotes adhesion. In many applications, printing features with good initial gloss and good gloss retention over time is important. For such applications, it may be desirable to incorporate one or more monomers (hereinafter gloss component) into the reactive diluent whose presence provides cured, printed features with better initial gloss and or gloss retention as compared to otherwise identical films lacking such gloss component. Preferred radiation curable reactive diluents comprise a sufficient amount of a gloss component such that a cured, homopolymer film of the material has a 60° gloss of at least 70, preferably at least 90, when measured according to ASTM D 523 Standard Test Method for Specular Gloss. When a gloss component is used, reactive diluents may comprise 0.5 to 30, preferably 0.5 to 15, more preferably 0.5 to 10 weight percent of the gloss component.

A wide variety of suitable monomers may be incorporated singly or in combination into the gloss component. One such class of monomers comprises radiation curable monomers that are solids at room temperature. Although solids by themselves, such monomers tend to be readily soluble in one or more of the other monomers constituting the reactive diluent. Thus, these solid, gloss promoting materials are easily included in ink jettable formulations. A specific example of such a monomer is N-vinylcaprolactam. This monomer is a liquid above about 34° C., has a viscosity of 2.88 centipoise at 50° C. Another monomeric example includes N-vinylpyrrolidinone.

In some instances, one or more monomers incorporated into the reactive diluent may have beneficial properties in one regard, yet may have poor wetting characteristics in terms of being able to wet a wide range of different kinds of porous and nonporous substrates. Tetrahydrofurfuryl acrylate is a good example of this. This monomer has excellent adhesive characteristics, but limited wetting characteristics. Accordingly, in such instances if desired, it may be desirable to incorporate one or more monomers (enhanced wetting component) into the reactive diluent whose presence causes the radiation curable fluid composition to have better wetting properties for the desired substrate(s) as compared to an otherwise identical composition lacking such a component. Preferred constituents of the enhanced wetting component preferably comprise one or more monomers respectively having surface tension properties of about 30 dynes/cm or less.

A wide variety of monomers with such low surface tension properties may be incorporated singly or in combination into the enhanced wetting component. One such class of monomers comprises at least one (meth)acrylate moiety and at least one aliphatic moiety that is straight chained or branched. Preferably, the aliphatic moiety is a branched hydrocarbyl moiety containing 3 to 20 carbon atoms. A specific example of this class of monomers is isooctyl acrylate. This monomer is a clear liquid at room temperature, has a molecular weight of 184, and has a surface tension of 28 dynes/cm at 25° C. Other examples include (meth)acrylate monomers comprising branched hydrocarbon moieties including 3 to 20 carbon atoms.

There are several representative examples of specific embodiments of radiation curable, reactive diluent formulations of the present invention that advantageously incorporate one or more of the reactive diluent components described above. For example, one such reactive diluent embodiment comprises 10 to 40 weight percent of the high Tg component (preferably isobornyl (meth)acrylate), 15 to 50 weight percent of the adhesion promoting component (preferably a combination of 1 to 20 parts by weight of 2-(2-ethoxyethoxy) ethyl (meth)acrylate per 1 to 20 parts by weight of tetrahydrofurfuryl (meth)acrylate), 5 to 10 weight percent of the gloss component (preferably N-vinylcaprolactam), 5 to 20 weight percent of a multifunctional radiation curable monomer (preferably 1,6-hexanediol di(meth)acrylate), and 5 to 20 weight percent of the low surface tension component (preferably isooctyl (meth)acrylate).

Another illustrative, preferred reactive diluent of the present invention comprises 30 to 50 weight percent of a high Tg component (preferably isobornyl (meth)acrylate), 30 to 50 weight percent of a adhesion promoting component (preferably 2(2-ethoxyethoxy)ethyl (meth)acrylate and/or tetrahydrofurfuryl (meth)acrylate), and 5 to 15 weight percent of a multifunctional radiation curable monomer (preferably 1,6-hexanediol di(meth)acrylate).

In some embodiments, it is preferred that the uncured, ink jettable inks of the present invention contain substantially no solvent. Substantially no solvent means that the uncured ink contains less than 10, preferably less than 2, more preferably less than 0.5 weight percent of solvent at the ink jet print head. Alternatively, in some embodiments, radiation curable ink compositions of the present invention also optionally may incorporate a limited, moderate amount of a solvent component with low surface tension properties. Preferred solvents desirably have a surface tension that is at least 2 dynes/cm below the surface tension of the reactive diluent; provided, however, that the more preferred solvents additionally have a surface tension that is less than about 30 dynes/cm at 25° C., preferably less than about 28 dynes/cm at 25° C. The preferred solvents also desirably have a relatively high flash point of at least about 50° C., preferably at least about 60° C.

The compositions desirably include enough solvent to promote the desired level of wetting and adhesion, to reduce the viscosity of the composition to a level suitable for ink jetting applications, to reduce the surface tension of the composition to the necessary level to wet a wide variety of substrates, and/or to provide a vapor barrier that forms over printed compositions in situ during radiation curing to improve the quality of the cure. So long as enough solvent is present to promote one or more of these objectives as desired, using lesser amounts of solvent tends to provide better quality printed features as compared to using greater amounts of solvent. Using more solvent than is needed may also increase the difficulty of drying the printed features during radiation curing and could deteriorate the cured image appearance and properties. As general guidelines, radiation curable ink compositions of the present invention may comprise 0.1 to 40, preferably 0.5 to 15, more preferably 1 to about 10 weight percent of the solvent component.

The solvent component may comprise one or more solvents that may be aqueous or organic, polar or nonpolar, or the like. Organic solvents that are polar or nonpolar are more preferred inasmuch as such solvents tend to dry more readily during radiation curing. Preferred organic solvents also promote compatibility with a wide range of polymer substrates by reducing the surface tension of the ink to the desired level. Also, preferred solvents should be compatible with the pigment dispersion so that the solvent does not cause ink instability. As another desirable characteristic, solvents of the present invention are desirably liquids at the print head temperature and undergo substantially no polymerization through free radical polymerization mechanisms when radiation curable components of the formulations are radiation cured.

It can be appreciated, therefore, that a wide range of solvents may be incorporated into the solvent component. Representative examples include water; alcohols such as isopropyl alcohol (IPA) or ethanol; ketones such as methyl ethyl ketone, cyclohexanone, or acetone; aromatic hydrocarbons; isophorone; butyrolactone; N-methylpyrrolidone; tetrahydrofuran; esters such as lactates, acetates, including propylene glycol monomethyl ether acetate (PM acetate), diethylene glycol ethyl ether acetate (DE acetate), ethylene glycol butyl ether acetate (EB acetate), dipropylene glycol monomethyl ether acetate (DPM acetate); iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

The esters, particularly those comprising branched aliphatic moieties such as isoalkyl moieties, are one class of preferred solvent. These solvents provide numerous advantages when incorporated into radiation curable ink jet inks. First, these solvents are compatible with all of the nonporous, polymeric substrates currently in widespread use in the sign making industry. The materials are also excellent solvents for the radiation curable monomers, oligomers, and polymers. Uniquely, these materials evaporate very easily, yet have relatively high flash points. Thus, these solvents are easily removed during radiation curing, yet do not significantly reduce the formulation flash point. Ink compositions including these solvents also have very favorable dot gain characteristics. A variety of branched, aliphatic ester solvents are commercially available under the trade designation EXXATE from ExxonMobil Corp. of Irving, Tex.

In preferred embodiments, relatively polar solvents such as isopropyl alcohol are less desirable then relatively nonpolar solvents in that polar solvents may have a strong affinity for the dispersants, if any, used to stabilize the pigment in the inks. This affinity can cause pigment agglomeration and ink destabilization. Solvents with static surface tension at 25° C. of greater than about 30 dynes/cm also are less preferred.

In addition to the radiation curable component and the solvent, one or more other additives may be incorporated into compositions of the present invention in accordance with conventional practices. These optional additives include one or more of photoinitiators, colorants, slip modifiers, thixotropic agents, foaming agents, antifoaming agents, flow or other rheology control agents, waxes, oils, plasticizers, binders, antioxidants, photoinitiator stabilizers, gloss agents, fungicides, bactericides, organic and/or inorganic filler particles, leveling agents, opacifiers, antistatic agents, dispersants, and the like.

The pigment used in the ink composition provides the desired color. Durable pigments are preferred for use in the inks of the invention, meaning that they have good outdoor durability and resist fading upon exposure to sun and the elements.

Pigments useful in the invention may be organic or inorganic. Suitable inorganic pigments include carbon black and titania ($TiO_2$), while suitable organic pigments include phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines. It will be recognized by those skilled in the art that organic pigments will be differently shaded, or even have different colors, depending on the functional groups attached to the main molecule.

Commercial examples of useful organic pigments include those known described in The Colour Index, Vols. 1-8, Society of Dyers and Colourists, Yorkshire, England having the designations Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60 (blue pigments); Pigment Brown 5, Pigment Brown 23, and Pigment Brown 25 (brown pigments); Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, and Pigment Yellow 175 (yellow pigments); Pigment Green 1, Pigment Green 7, Pigment Green 10, and Pigment Green 36 (green pigments); Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61 (orange pigments); Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224 (red pigments); Pigment Violet 19, Pigment Violet 23, Pigment Violet 37, Pigment Violet 32, and Pigment Violet 42 (violet pigments); and Pigment Black 6 or 7 (black pigments).

The pigment is generally incorporated into the ink composition by milling the pigment into selected reactive monomers and optional oligo/resin materials. If the ink is to be used in applications wherein the ink is used in combination with a retroreflective backing, the pigment must be milled to a particle size that provides sufficient transparency to permit retroreflection and provide retroreflective color. This may be accomplished, for example, by milling the pigment.

If a colorant in the form of pigment is used, a dispersant may be desired in some instances in order to stabilize the pigment. The choice of dispersant depends on factors such as the type of pigment used, the type of oligo/resin(s) in the formulation, the composition of the phase(s) into which the pigment will be dispersed, and the like. Example of commercially available dispersants suitable for this application include those sold under the trade designations SOLSPERSE from Avecia, Inc. of Wilmington, Del., EFKA from The Lubrizol Corp. of Wickliff, Ohio, and BYK from BYK Chemie, USA of Wallingford, Conn. It is possible to use mixtures of dispersants also. The amount of dispersant added depends on the type and concentration of the pigment. Typically 20 to 100 parts by weight of dispersant are used per 100 parts by weight of organic pigment, and between 5 to 80 parts by weight of the dispersant per 100 parts by weight inorganic pigment. Desirably, to avoid destabilizing the ink, the dispersant, if any, has a higher affinity for the pigment than for the oligo/resin(s), if any.

In the preferred mode of the invention, the inks are cured using UV radiation, which typically benefits from the presence of at least one photoinitiator. The type of photoinitiator used depends on the choice of colorant in the ink and on the wavelength of the radiation. Commercially available free-radical generating photoinitiators suitable for the invention include, but are not limited to benzophenone, benzoin ether and acylphosphine photoinitiators such as those sold under the trade designations IRGACURE and DAROCUR from Ciba Specialty Chemicals of Tarrytown, N.Y.

In addition, the colorant in the ink will absorb part of the incident radiation, depleting the available energy to activate the photoinitiator(s). This will slow down the curing rate and may result in poor through and/or surface cure of the applied ink. It is therefore preferred to use a mixture of photoinitiators in order to provide both surface and through cure. The amount of photoinitiator(s) used typically varies between 1 and 15 weight percent and preferably between 3 and 12 weight percent and more preferably between 5 and 10 weight percent for formulations containing colorant. The uncolored inks can have lower initiator concentrations. Co-initiators and amine synergists can be included in order to improve curing rate. Examples include isopropylthioxanthone, ethyl-4-(dimethylamino)benzoate, 2-ethylhexyl dimethylaminobenzoate, and dimethylaminoethyl methacrylate.

To enhance durability of a printed image graphic, especially in outdoor environments exposed to sunlight, a variety of commercially available stabilizing chemicals can be added optionally to inks of the present invention. These stabilizers can be grouped into the following categories: heat stabilizers, ultra-violet light stabilizers, and free-radical scavengers. Heat stabilizers are commonly used to protect the resulting image graphic against the effects of heat and are commercially available under the trade designations MARK V 1923 (Witco Corp. of Greenwich, Conn.); SYNPRON 1163, Ferro 1237 and Ferro 1720 (Ferro Corp., Polymer Additives Div., Walton Hills, Ohio). Such heat stabilizers can be present in amounts ranging from about 0.02 to about 0.15 weight percent.

Ultraviolet light stabilizers are commercially available under the trade designations UVINOL 400 (a benzophenone type UV-absorber sold by BASF Corp. of Parsippany, N.J.), Cyasorb UV1164 from Cytec Industries, West Patterson, N.J., and TINUVIN 900, TINUVIN 123 and/or 1130 UV-absorber (Ciba Specialty Chemicals, Tarrytown, N.Y.) and can be present in amounts ranging from about 0.1 to about 5 weight percent of the total ink.

Free-radical scavengers can be present in an amount from about 0.05 to about 0.25 weight percent of the total ink. Nonlimiting examples of the scavenger include hindered amine light stabilizer (HALS) compounds, hydroxylamines, sterically hindered phenols, and the like.

Commercially available HALS compounds include TINUVIN 292 (trade designation for a hindered amine light stabilizer sold by Ciba Specialty Chemicals, Tarrytown, N.Y.) and CYASORB UV3581 (trade designation for a hindered amine light stabilizer sold by Cytec Industries, West Patterson, N.J.).

A wide variety of gloss agents may be used. Examples include aminobenzoates, secondary amines, silicones, waxes, morpholine adducts, materials available under trade designations Sartomer CN386, CN381, CN383, and the like.

The compositions of the present invention are made by mixing together the desired ingredients using any suitable technique. For example, in a one step approach, all of the ingredients are combined and blended, stirred, milled, or otherwise mixed to form a homogeneous composition. As another alternative, at least some of the components of the radiation curable component and at least some of the solvent may be blended together in a first step. Then, in one or more additional steps, the remaining solvent if any, the remaining constituents of the radiation curable component if any, and one or more additives may be incorporated into the composition via blending, milling, or other mixing technique.

As still yet another approach which is particularly preferred when pigment colorants are to be included in the radiation curable, fluid compositions, a preferred processing approach involves preparing the composition such that the pigment particle size of the colorant is less than 5 micrometers, preferably less than 1 micron, ideally less than 0.5 micrometers. The particle size of the pigment colorant may be characterized by an appropriate method such as dynamic light scattering (DLS) or microscopy. We have found that ink jettable compositions comprising such fine pigment colorants provide excellent color saturation, transparency, and jettability, especially for applications in which the composition is a colored ink that is printed onto retroreflective signage of outdoor signage.

Initially, a dispersion is prepared containing from about 1 to about 80 weight percent of the pigment colorant with the balance being the oligo/resin, reactive diluent, and other additives, if desired. At this stage, the pigment may be incorporated into the dispersion as supplied by the vendor. Subsequent milling will reduce the pigment size to the desired fine particle size. This initial dispersion may be prepared by first pre-dissolving a dispersant in the liquid components and then adding the desired amount of pigment powder. Initial wetting of pigment is accomplished with high shear mixing. Next, the dispersion is subjected to high energy milling techniques such as ball milling, sand milling, horizontal media milling, attritor milling, or 2- or 3-roll mills, or the like in order to reduce the pigment to the desired particle size. Following the milling, the resultant ink dispersion is exceptionally stable (i.e. the dispersion remains homogeneous and particle size does not increase over long periods of time, e.g., 26 weeks). Following the milling procedure, the pigment dispersion may be diluted with additional solvents, monomers, oligomers, polymers, dispersants, flow agents, surfactants, photoinitiators, UVA, HALS, and/or the like. The millbase also remains stable following the addition and incorporation of these additional components. See, e.g., Patton "*Paint Flow and Pigment Dispersion*", ISBN #0-471-89765-5.

The compositions of the present invention may be applied in any suitable fashion onto a receiving substrate such as wood, metal, paper, woven or nonwoven fabrics, resin-coated paper, foil, polymer articles, polymer films, and the like. Representative examples of coating techniques include screen printing, spraying, ink jetting, extrusion-die coating, flexographic printing, offset printing, gravure coating, knife coating, brushing, curtain coating, wire-wound rod coating, bar coating and the like. The compositions of the present invention may be used to form graphic elements, text items, continuous layers, bar codes, or other features.

Compositions of the present invention are highly compatible with both porous and nonporous substrates. The compatibility with nonporous materials allows these compositions to be applied onto a wide range of nonporous polymer films. Nonlimiting examples of such films include single and multilayer constructions of acrylic-containing films, poly(vinyl chloride)-containing films, (e.g., vinyl, plasticized vinyl, reinforced vinyl, vinyl/acrylic blends), urethane-containing films, melamine-containing films, polyvinyl butyral-containing films, and multi-layered films having an image reception layer comprising an acid- or acid/acrylate modified ethylene vinyl acetate resin, as disclosed in U.S. Pat. No. 5,721,086 (Emslander et al.) or having an image reception layer comprising a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature.

Such films have two major surfaces with one surface being able to receive an inkjet image graphic of the present invention and the other major surface being adhered to a field of pressure sensitive adhesive. Usually, the field of adhesive on one major surface is protected by a release liner. Such films can be clear, translucent, or opaque. Such films can be colorless or solid color or a pattern of colors. Such films can be transmissive, reflective, or retroreflective.

Commercially available films known to those skilled in the art include the multitude of films available from 3M Company under the trade designations PANAFLEX, NOMAD, SCOTCHCAL, SCOTCHLITE, CONTROLTAC, and CONTROLTAC-PLUS.

After being coated, the compositions may be cured using a suitable fluence and type of curing energy. The amount of curing energy to be used for curing depends upon a number of factors, such as the amount and the type of reactants involved, the energy source, web speed, the distance from the energy source, and the thickness of the material to be cured. Generally, the rate of curing tends to increase with increased energy intensity. The rate of curing also may tend to increase with increasing amounts of photocatalyst and/or photoinitiator being present in the composition. As general guidelines, actinic radiation typically involves a total energy exposure from about 0.1 to about 10 Joules per square centimeter, and electron beam radiation typically involves a total energy exposure in the range from less than 1 megarad to 100 megarads or more, preferably 1 to 10 megarads. Exposure times may be from less than about 1 second up to 10 minutes or more. Radiation exposure may occur in air or in an inert atmosphere such as nitrogen.

The present invention will now be further described with reference to the following illustrative examples. The following abbreviations are used throughout the examples:

| NM | not measured; |
|---|---|
| cP | centipoise; |
| THFFA | Tetrahydrofurfuryl acrylate; |
| IBOA | isobornyl acrylate; |
| EEEA | 2-(2-ethoxyethoxy)ethyl acrylate; |
| HDDA | hexanediol diacrylate; |
| IOA | isooctyl acrylate; |
| NVC | N-vinylcaprolactam; |

| | -continued |
|---|---|
| EG | 3M SCOTCHLITE ENGINEER GRADE REFLECTIVE SHEETING 3290 retroreflective film available from 3M Company of St. Paul, MN; |
| HI | 3M SCOTCHLITE HIGH INTENSITY SHEETING 3870 retroreflective film available from 3M Company; |
| DG | 3M SCOTCHLITE DIAMOND GRADE LDP REFLECTIVE SHEETING 3970 retroreflective film available from 3M Company; |
| 3540C | 3M CONTROLTAC PLUS GRAPHIC MARKING FILM WITH COMPLY ™ PERFORMANCE 3540C (SCREEN PRINTING) available from 3M Company; |
| 180-10 vinyl | 3M CONTROLTAC PLUS GRAPHIC SYSTEM 180-10 film available from 3M Company; |
| SF96-100 | SILICONE SF96-100, a trade designation for a silicone flow agent available from General Electric Corp. of Schenectady, NY; |
| IPTX | Isopropylthioxanthone commercially available under the trade designation SPEEDCURE ITX from Aceto Corp. of New Hyde Park, NY; |

The following additional materials were used in the examples:

EFKA 4046 is a trade designation for a high molecular weight polymeric polyurethane based dispersant available from The Lubrizol Corporation of Wickliff, Ohio and supplied as 40 weight percent solids in acetate solvents. Before use it was dried as follows: precipitated in heptane, the precipitate was rinsed twice in heptane, complete drying was accomplished using evaporation at reduced pressure.

TEGORAD 2500 is a trade designation for a reactive silicone flow agent available from Goldschmidt Chemical Corp. of Hopewell, Va.

IRGANOX 1035, TINUVIN 123, TINUVIN 400 and TINUVIN 292 are trade designations for stabilizers available from Ciba Specialty Chemicals of Tarrytown, N.Y.

SUN BLACK predispersed pigment is a trade designation for black pigment available from Sun Chemical Corp. of Fort Lee, N.J.

XAAR XJ128-360, and XAAR XJ128-200 nozzle printheads were obtained from Xaar Limited of Cambridge, England.

Oligomer A was prepared according to the following procedure: 281.3 g TONE M-100 polycaprolactone acrylate, available from Union Carbide Corp. of Danbury, Conn., (0.818 equivalents) was added to 0.040 g 2,6-di-tert-butyl-4-methyl phenol (BHT) and 1 drop dibutyltin dilaurate (both available from Aldrich Chemical Co. of Milwaukee, Wis.). This was heated with stirring under an atmosphere of dry air to 90° C. 84.2 g VESTANAT TMDI mixture of 2,2,4-trimethylhexamethylene diisocyanate and 2,4,4-trimethylhexamethylene diisocyanate (0.80 equivalents), available from Creanova Inc. of Somerset, N.J., was added slowly, controlling the exotherm to under 100° C. with a water bath. The reaction was held at 90° C. for 8 hours, whereupon the IR spectrum showed no residual isocyanate. The Brookfield viscosity of the product was determined to be 2500 CP 25° C. The calculated molecular weight of this material was 875.

Oligomer B was prepared according to the following procedure: 60 g polycaprolactone acrylate (molecular weight 344, 0.174 equivalents, Aldrich Chemical Co. of Milwaukee, Wis.) was added to 200 mg BHT and 1 drop dibutyltin dilaurate. This was heated under an atmosphere of dry air to 45° C. 24 g VESTANAT TMDI mixture of 2,2,4-trimethylhexamethylene diisocyanate and 2,4,4-trimethylhexamethylene diisocyanate, (0.236 equivalents), available from Creanova Inc. of Somerset, N.J., was added slowly, controlling the exotherm to under 55° C. After a 2 hour hold at 50° C., 11.1 g TONE 0305 polycaprolactone triol having 550 molecular weight available from Union Carbide Corp. of Danbury, Conn., (0.062 equivalents) was added along with 2 drops dibutyltin dilaurate. The reaction was held at 50° C. for 48 hours, adding 2 drops of dibutyltin dilaurate at the 24 hour mark. After this the infrared spectrum showed a small amount of residual isocyanate which was consumed by adding 1 g ethanol and holding for 2 hours. The Brookfield viscosity of the product was determined to be 9000 CP at 25° C. Calculated molecular weight data: $M_n$=1250, $M_w$=2100. Gel permeation chromatography results: $M_n$=1380, $M_w$=2480.

PARALOID B-60 is a trade designation for a butyl methacrylate-methyl methacrylate copolymer having 50,000 number average molecular weight available from Rohm & Haas of Philadelphia, Pa.

BAYER YELLOW Y5688 is a trade designation for a yellow pigment available from Bayer Corp. of Pittsburgh, Pa.

LAMPBLACK LB 101 PIGMENT I is a trade designation for black pigment available from Pfizer Inc. of New York, N.Y.

STABAXOL I is a trade designation for 2,2',6,6'-tetraisopropyldiphenyl carbodiimide available from Rhein Chemie Corp. of Trenton, N.J.

COATOSIL 3573 is a trade designation for a flow agent available from Witco Corp. of Greenwich, Conn.

DAROCUR 4265 is a trade designation for a 1:1 mixture of 2,4,6-trimethylbenzoyldiphenylphosphine oxide and 2-hydroxy-2-methyl-1-phenylpropan-1-one, IRGACURE 184 is a trade designation for 1-hydroxycyclohexyl phenyl ketone, IRGACURE 819 is a trade designation for bis(2,4,6-trimethylbenzoyl)phenylphosphine oxide, IRGACURE 651 is a trade designation for 2,2-dimethoxy-1,2-diphenylethan-1-one, and IRGACURE 369 is a trade designation for 2-benzyl-2-dimethylamino-l-(4-morpholinophenyl)butan-1-one, all available from Ciba Specialty Chemicals of Tarrytown, N.Y.

SOLSPERSE 32000 is a trade designation for a dispersant available from Zeneca Inc. of Wilmington, Del.

CN-964 B85 is a trade designation for an aliphatic polyester based urethane diacrylate oligomer blended with 15 weight percent hexanediol diacrylate, PRO-4303 is a trade designation for a mixture of 10 weight percent THFFA, 16 weight percent tris(2-hydroxy ethyl)isocyanurate triacrylate, and 74 weight percent aliphatic polyester based urethane diacrylate, all available from Sartomer Co. of Exton, Pa.

EBECRYL 4830 is a trade designation for an aliphatic urethane diacrylate diluted with 10% by weight tetraethylene glycol diacrylate; EBECRYL 284 is a trade designation for an aliphatic urethane diacrylate diluted with 12% hexanediol diacrylate; EBECRYL 8402 is a trade designation for an aliphatic urethane diacrylate (1000 g/mole), EBECRYL 810 is a trade designation for a low viscosity multi-functional polyester acrylate (4 reactive groups, 1000 g/mole), all available from UCB Chemicals of Smyrna, Ga.

C.I. Pigment Red 179 and C.I. Pigment Red 224 are red pigments available from Bayer Corp. of Pittsburgh, Pa.

Tetrahydrofurfuryl acrylate, isobornyl acrylate, 2-(2-ethoxyethoxy)ethyl acrylate, hexanediol diacrylate, isooctyl acrylate and N-vinylcaprolactam are available from Sartomer Co. of Exton, Pa.

All jetted samples were first filtered using a disposable 25 mm diameter syringe filter with 2.7 micron pore size commercially available from Whatman, Inc. of Clifton, N.J.

In the Tables below, the abbreviations "H", "E", and "I" refer to HDDA, EEEA, and IBOA respectively.

Test Methods Used in the Examples

Brookfield viscosity was measured using a Brookfield Model LVT viscometer, Brookfield Instruments, Brookfield, Mass.

Otherwise, viscosity was measured using a Rheometrics SR-200 (Rheometric Scientific, Inc. of Piscataway, N.J.) controlled stress rheometer with the cup and bob geometry. The viscosity dependence on shear rate and temperature was recorded. For shear thinning samples, it was assumed that the viscosity as measured at 1000 $s^{-1}$ was the same as the viscosity during jetting.

The power law index was calculated from measurement of the shear thinning behavior of the sample.

Static surface tension was measured at room temperature using a Kruss K-10tensiometer (available from Kruss GmbH of Hamburg Germany) using the plate method.

Taber Abrasion measurements were conducted using a Taber Abraser Model 503 (Standard Abrasion Tester) by Teledyne Taber of Tonawanda, N.Y. according to ASTM D 4060, for 40 cycles using CS-10 wheels and 1000 g weights. The 60° Gloss was measured at identical locations before and after abrasion and the percent gloss retention calculated.

Retroreflectance was measured according to ASTM 810 Standard Test Method for Coefficient of Retroreflection of Retroreflective Sheeting.

Gloss was measured using a hand-held gloss meter such as those available from Byk-Gardner USA of Columbia, Md.

Falling Sand Abrasion was measured according to the general method of ASTM D 968 Standard Test Methods for Abrasion Resistance of Organic Coatings by the Falling Sand Abrasive Tester. The 60° gloss was measured at identical locations before and after 100 mL total sand had been dropped and the percent gloss retention calculated.

Percent elongation of cured films was determined according to ASTM Test Method D-5035.

EXAMPLE 1

A series of unpigmented UV curable clear inks (Samples 1a-1k) were prepared. As shown in the following table, the indicated oligo/resin was combined with the indicated ratio of monomers and 2 weight percent IRGACURE 184 photoinitiator. For each sample, all ingredients were placed in a glass jar and allowed to mix overnight by tumbling on the rollers of a jar mill.

Physical properties of the compositions were measured and their jetting behavior was observed. Table 1 lists the compositions, viscosity, surface tension, and apparent elasticity of the samples.

TABLE 1

Physical Properties Of Jetted Samples

| Clear Ink | Oligo/Resin | Oligo/Resin % | H:E:I | Viscosity 25° C. (cP) | Viscosity 40° C. (cP) | Surface Tension (dynes/cm) | Power law Index |
|---|---|---|---|---|---|---|---|
| 1a | PARALOID B-60 | 10 | 2:3:3 | 26.3 | 15.8 | 31.5 | 0.992 |
| 1b | CN964B-85 | 20 | 2:3:3 | 17 | 9.8 | 31.8 | 1 |

TABLE 1-continued

Physical Properties Of Jetted Samples

| Clear Ink | Oligo/Resin | Oligo/Resin % | H:E:I | Viscosity 25° C. (cP) | Viscosity 40° C. (cP) | Surface Tension (dynes/cm) | Power law Index |
|---|---|---|---|---|---|---|---|
| 1c | EBECRYL 4830 | 20 | 2:3:3 | 21.8 | 11.2 | 31.8 | 1 |
| 1d | EBECRYL 284 | 20 | 2:3:3 | 19.2 | 10 | 31.6 | 1 |
| 1e | EBECRYL 8402 | 20 | 2:3:3 | 16 | 8.7 | 32.0 | 1 |
| 1f | EBECRYL 810 | 20 | 1:4:9 | 7.8 | NM | 31.4 | 1 |
| 1g | EBECRYL 810 | 30 | 1:4:9 | 11.5 | 6.3 | 32.6 | 1 |
| 1h | EBECRYL 810 | 40 | 1:4:9 | 16.9 | 9.3 | 33.0 | 0.997 |
| 1i | EBECRYL 810 | 50 | 1:4:9 | 26.8 | 13.2 | 32.8 | 0.994 |

Jetting was done using a Trident Pixel Jet printhead with 64 channels available from Trident International of Brookfield, Conn. Samples were jetted at 10, 12, and 14 cP viscosity (the desired viscosity was achieved by heating the printhead). Jetting conditions were as follows: Frequency: 4000 Hz; Pulse Width: 16 microseconds; Driving voltage: varied from 35V to 45V. A high speed camera system was used to evaluate the jetting behavior of the samples. The system consisted of a SensiCam high speed camera obtained from Cooke Corp. (Tonawanda, N.Y.), a strobe light, a computer equipped with a data acquisition board, and control electronics. Ink drop velocity was measured after 100 micro seconds delay time from the point of pulse application to the printhead. The velocity was measured using Optimas image analysis software obtained from Optimas Corporation (Bothell, Wash.). The results are given in Table 2.

In order to evaluate jetting performance, the following parameters were measured for each sample (shown in Table 2): Drop velocity at 100 microseconds after firing Getting conditions: pulse width=16 microseconds; firing voltage=45 V; temperature to achieve 10 cP viscosity for the fluid); drop detachment time from the nozzle; the presence or absence of satellites; the number and shape of satellites; the minimum voltage required to start jetting (jetting conditions: pulse width=16 microseconds; temperature to achieve 12 cP viscosity for the fluid); and liquid build-up at the nozzle.

TABLE 2

Jetting Performance of Clear Inks 1a-1i

| Sample | Velocity (m/s) | Detachment Time (μs) | Minimum Voltage (V) | Nozzle Buildup | Satellites |
|---|---|---|---|---|---|
| 1a | 7.6 | 120 | 34.7 | Severe | few |
| 1b | 8.6 | 90 | 32.1 | Some | lots |
| 1c | 9.0 | 90 | 31.3 | Some | lots |
| 1d | 9.5 | 90 | 32.8 | Some | lots |
| 1e | 11.0 | 80 | 29.5 | Some | lots |
| 1f | 10.7 | 80 | NM | None | lots |
| 1g | 9.3 | 80 | 29.9 | None | lots |
| 1h | 10.4 | 90 | 34.0 | Some | few |
| 1i | 7.3 | 90 | 28.2 | Severe | Almost none |

Each clear ink was coated onto HI sheeting using a #6 Meyer bar (RD Specialties of Webster, N.Y., producing a nominal wet film thickness of 10-12 microns, and cured immediately using an RPC UV Processor (RPC Industries of Plainfield, Ill.) containing two 12" medium pressure mercury bulbs under the following conditions: Normal/Normal settings, 50 feet/min, nitrogen purge, 200-240 mJ/cm².

Cured film properties, both initial and retained following weathering or mechanical abrasion, of selected clear coat formulations are shown in Table 3 along with 880I Process Color Series clear, which is a solvent based screen printing clear available from 3M Company of St. Paul, Minn.

TABLE 3

Properties Of Non-Pigmented Cured Films On HI Film after Weathering

| Clear Ink | % Oligo/Resin | H:E:I | Initial 60° Gloss | Initial Retro-Reflectance (−4°/.2°) | % Retained 60° Gloss | % Retained Retro-Reflectance | Taber Abrasion % Retained 60° Gloss |
|---|---|---|---|---|---|---|---|
| 1a | 10% PARALOID B-60 | 2:3:3 | 121.3 | 304 | 107.7 | 100.2 | n.m. |
| 1b | 20% CN964 B-85 | 2:3:3 | 127.8 | 315 | 103.0 | 98.3 | n.m. |
| 1c | 20% EBECRYL 4830 | 2:3:3 | 117.9 | 303 | 112.0 | 103.5 | 37.8 |
| 1f | 20% EBECRYL 810 | 5:10:1 | 126.8 | 311 | 72.8 | 38.3 | n.m. |
| 1j | 20% EBECRYL 284 | 2:7:7 | 129.9 | 327 | 97.2 | 98.2 | n.m. |

TABLE 3-continued

Properties Of Non-Pigmented Cured Films On HI Film after Weathering

| Clear Ink | % Oligo/Resin | H:E:I | Initial 60° Gloss | Initial Retro-Reflectance (−4°/.2°) | % Retained 60° Gloss | % Retained Retro-Reflectance | Taber Abrasion % Retained 60° Gloss |
|---|---|---|---|---|---|---|---|
| 1k | 20% EBECRYL 8402 | 2:7:7 | 128.8 | 328 | 100.2 | 98.2 | 44.4 |
| 880I | — | — | 128.8 | 322 | 92.9 | 92.5 | 25.5 |

In Table 3 values represent data after 4000 h of xenon-arc exposure, conducted according to ASTM G155 Cycle 1.

EXAMPLE 2

A millbase (Millbase 2) was prepared from 81.25 parts C.I. Pigment Red 179, 81.25 C.I. parts Pigment Red 224, 40.63 parts EFKA 4046 (dried), 67.03 parts HDDA, 286.0 parts EEEA and 93.84 parts IBOA. To prepare the millbase, EFKA 4046 was dissolved in a mixture of the monomers. The pigments then were added to the solution and incorporated by mixing with a rotor-stator mixer. The dispersion was milled using a Netszch Mini-Zeta bead mill (available from Netzsch Inc. of Exton, Pa.) using 0.5 mm zirconia media. The dispersion was processed for 40 minutes in the mill. The average particle size was measured to be 365 nm with a standard deviation of 90 nm measured at 25° C. in tetrahydrofurfuryl acrylate on a Coulter N4+ particle size analyzer (available from Coulter Corporation, Miami Fla.).

Following processing and characterization, the millbase was diluted with an oligomer and additional EFKA material to prepare Composition A in the following proportions: 53.0 parts red millbase (after processing), 37.0 parts Sartomer CN964 B-85; 0.44 parts EFKA 4046 (dried). The materials were combined by gentle stirring followed by tumbling of the sample on rollers overnight. The particle size of this sample did not change following the addition of the oligomer and additional dispersant.

A fully formulated red ink (Ink 2) was prepared by dilution of Composition A with photoinitiator and additional monomers. The final composition of Ink 2 on a weight basis was as follows: 4.25 parts C.I. Pigment Red 179, 4.25 parts C.I. Pigment Red 224, 10 parts HDDA, 14 parts IBOA, 42 parts EEEA, 20 parts Sartomer CN964-85, 3 parts EFKA 4046 and 2.5 parts IRGACURE 819.

Ink 2 had power law index of 0.97, a viscosity at 25° C. and 1000 s$^{-1}$ of 32.4 cP, and 10 CP at 52° C. at 1000 s$^{-1}$.

The ink was jetted using a 64 channel Trident Pixel Jet printhead (available from Trident International of Brookfield, Conn.) at 50V. The pulse width was 16 µs, frequency=4000 Hz, and printhead temperature was 50° C.

Alphanumerical data and line patterns were printed on various substrates. Ink 2 printed consistently and reliably during five hours. The printed images were cured in two ways:

Curing Method 1: UV light from an EFOS ULTRACURE 100SS Plus lamp (EFOS Corp. of Missisaugua, Ontario, Canada) was delivered via fiber optic flexible connection to a location next to the printhead. In this configuration the elapsed time between printing and curing was a fraction of a second. Nitrogen purge during cure was used. The intensity of the light was not sufficient for complete cure. Therefore, cure was completed off-line using a UV processor with nitrogen purge as described in Example 1 above.

Curing Method 2: Inks were printed and cured as in Example 1. Elapsed time between printing and curing was approximately 5 minutes.

Widths of single printed lines were measured using optical microscopy. These values are related to ink flow and dot gain, and they correlate with image quality.

Adhesion of the ink on different substrates was measured according to ASTM D 3359-95A as described above. Results are shown in Table 4.

TABLE 4

Line Width and Adhesion Test Results

| Substrate | Line Width (Cure Method 1) | Line Width (Cure Method 2) | Adhesion (Cure Method 1) | Adhesion (Cure Method 2) |
|---|---|---|---|---|
| Vinyl 180-10 | 130 microns | 130 microns | 100% | 100% |
| 3540C | 130 microns | 159 microns | 95% | 95% |
| ° | 178 microns | 344 microns | 50% | 100% |
| EG | 173 microns | 224 microns | 60% | 90% |
| HI | 174 microns | 382 microns | 90% | 95% |

EXAMPLE 3

A red ink (Ink 3) was prepared as in Example 2 from 4.25 parts C.I. Pigment Red 179, 4.25 parts C.I. Pigment Red 224, 7.9 parts HDDA, 27.7 parts IBOA, 27.7 parts EEEA, 20.0 parts EBECRYL 8402, 1.42 parts EFKA 4046, 2.75 parts IRGACURE 819, 3.0 parts TINUVIN 123 and 1.0 parts TINUVIN 400.

Select film properties of this ink were evaluated for comparison to a commercially available, solvent-based screen printing ink (3M screen print ink series 880I, Table 5):

TABLE 5

Film Properties of Inks on HI sheeting

| Ink | Initial 60° gloss | Initial Retroreflectance (−4°/.2°) | Color (D65 2° observer) x | y | Y | Falling Sand Abrasion % 60° gloss retention |
|---|---|---|---|---|---|---|
| Ink 3 | 108.2 | 18.7 | 0.6453 | 0.3146 | 4.22 | 85 |
| 883I* | 104.3 | 57.4 | 0.6466 | 0.3151 | 3.65 | 35 |

*883I is a red ink in the 880I series available from 3M.

EXAMPLE 4

A yellow millbase (Millbase 4) was prepared by combining 40 parts BAYER YELLOW Y5688, 25 parts SOLSPERSE 32000, and 35 parts THFFA with milling for 45 minutes as in Example 2.

A yellow ink (Ink 4) was prepared as in Example 2 from 20 parts Millbase 4, 30 parts Oligomer A, 33 parts THFFA, 30 parts IBOA, 30 parts EEEA, 20 parts NVC, 10 parts HDDA, 4 parts TINUVIN 292, 1.8 parts STABAXOL I, 0.2 parts IRGANOX 1035, 12 parts IRGACURE 819, 4 parts IRGACURE 651, 4 parts IRGACURE 369, 2 parts IPTX.

To 25 parts of the above Ink 4 was added 0.1 grams of SF96-100 flow agent to reduce the surface tension to 23.5 dynes/cm at 25° C. The resultant viscosity was 17.6 cP at 25° C.

The ink was printed using an x-y positionable platen using a XAAR XJ128-360 printhead. A test pattern was printed at 317×285 dpi resolution onto 180-10 vinyl film and DG sheeting. All films were cured as described in Example 1. The cured ink showed 100% adhesion on both substrates. Dot diameters of 122 microns on 180-10 vinyl and 160 microns on DG sheeting were observed.

EXAMPLE 5

A magenta millbase (Millbase 5) was prepared by combining 33.3 parts CIBA RT-343-D pigment, 9.9 parts SOLSPERSE 32000, and 57.1 parts THFFA with milling for 70 minutes as in Example 2.

A magenta ink (Ink 5) was prepared as in Example 2 from 2.5 parts Millbase 5, 5 parts CN 964B85, 3.9 parts HDDA, 7.5 parts EEEA, 5.25 parts IBOA, 1.5 parts DAROCUR 4265 and 0.1 part TEGORAD 2500.

Graphics were printed with Ink 5 using the x-y positionable platen with a XAAR XJ128-200 printhead at 317×285 resolution onto 180-10 vinyl film. The printed image was cured as described in Example 1. The printed image showed excellent flow and wetting on 180-10 vinyl with sufficient dot gain to produce complete solid fill patterns. The cured film was glossy and non-tacky.

EXAMPLE 6

Millbases 6a, 6b, 6c and 6d were prepared using the Netzsch Mini-Zeta bead mill using 0.5 mm Zirconia media as in Example 2.

Yellow millbase (Millbase 6a) included 33 parts BAYER Y-5688 pigment, 9.9 parts SOLSPERSE 2000, and 57.1 parts THFFA, and was milled for 70 minutes.

Magenta millbase (Millbase 6b) consisted of 33.3 parts CIBA RT343-D pigment, 11.55 parts SOLSPERSE 32000, and 55.45 parts THFFA and was milled for 90 minutes.

Cyan millbase (Millbase 6c) included 22.9 parts Sun 249-1284 pigment, 25.4 parts SOLSPERSE 5000, 10.2 parts SOLSPERSE 32000, and 41.5 parts THFFA and was milled for 70 minutes.

Black millbase (Millbase 6d) included 25 parts Lampblack LB-1011, 5 parts SOLSPERSE 32000, and 70 parts THFFA, and was milled for 45 minutes.

From these millbases, Inks 6a, 6b, 6c and 6d were prepared according to the method of Example 2 using the following formulations:

TABLE 5

Process Color Ink Formulations

| Component | Ink 6a (parts) | Ink 6b (parts) | Ink 6c (parts) | Ink 6d (parts) |
|---|---|---|---|---|
| Millbase 6a | 7.01 | | | |
| Millbase 6b | | 19.99 | | |
| Millbase 6c | | | 9.00 | |
| Millbase 6d | | | | 9.99 |
| Oligomer A | 28.00 | 20.01 | 25.99 | 28.98 |
| THFFA | 28.00 | 20.01 | 25.99 | 28.98 |
| EEEA | 11.01 | 7.51 | 12.00 | 12.00 |
| IBOA | 15.00 | 15.00 | 13.00 | 12.00 |
| NVC | 10.00 | 10.01 | 10.01 | 9.99 |
| HDDA | 5.00 | 5.01 | 5.00 | 4.99 |
| TINUVIN 292 | 2.01 | 2.00 | 2.00 | 2.00 |
| STABAXOL I | 0.90 | 0.90 | 0.90 | 0.90 |
| IRGANOX 1035 | 0.10 | 0.10 | 0.10 | 0.10 |
| IRGACURE 819 | 5.00 | 6.00 | 5.00 | 5.00 |
| IRGACURE 651 | 2.01 | 3.01 | 1.98 | 3.01 |
| IRGACURE 369 | 2.01 | 2.5 | 2.00 | 2.99 |
| IPTX | 1.01 | 1.01 | 1.01 | 1.00 |

All four inks showed good cure in air at 200 mJ/cm² exposure using two medium pressure Hg lamps producing tack-free glossy films on 180-10 vinyl films. Physical properties of the inks are shown in Table 6.

TABLE 6

Physical Properties of Process Color Inks

| Property | Ink 6a | Ink 6b | Ink 6c | Ink 6d |
|---|---|---|---|---|
| Reflectance Optical Density | 1.06 | 2.20 | 2.19 | 2.18 |
| Surface Tension | 33.8 dyne/cm | 34.1 dyne/cm | 33.5 dyne/cm | 34.4 dyne/cm |
| Viscosity at 25° C. | 37.4 cP | 38.8 cP | 33.0 cP | 42.4 cP |
| Viscosity at 50° C. | 14.2 cP | 15.4 cP | 12.7 cP | 15.4 cP |

EXAMPLE 7

A set of four process color inks was prepared using the same millbases as in Example 6. Compositions are shown in the Table 7.

TABLE 7

Process Color Ink Formulations

| Component | Ink 7a (parts) | Ink 7b (parts) | Ink 7c (parts) | Ink 7d (parts) |
|---|---|---|---|---|
| Millbase 6a | 7.00 | | | |
| Millbase 6b | | 20.01 | | |
| Millbase 6c | | | 9.52 | |
| Millbase 6d | | | | 9.99 |
| PRO-4303 | 17.99 | 12.04 | 16.00 | 17.10 |
| THFFA | 9.00 | 8.50 | 9.01 | 9.00 |
| IBOA | 20.00 | 20.00 | 20.01 | 20.00 |
| IOA | 21.99 | 14.00 | 21.49 | 25.01 |
| NVC | 5.01 | 5.01 | 5.01 | 5.00 |
| HDDA | 7.99 | 8.00 | 8.00 | 8.00 |
| IRGACURE 819 | 6.00 | 6.01 | 6.01 | 5.00 |
| IRGACURE 651 | 2.01 | 3.00 | 2.01 | 3.01 |
| IRGACURE 369 | 2.01 | 2.50 | 2.00 | 3.00 |
| IPTX | 1.00 | 1.00 | 1.00 | 1.00 |

All four inks showed good cure in air at 150 mJ/cm² exposure using two medium pressure Hg lamps producing tack free glossy film on 180-10 vinyl. Other physical properties of the inks are shown in Table 8.

After 2000 hours of xenon-arc exposure conducted according to ASTM G155, Cycle 1, the cured printed inks were evaluated as shown in Table 10. DE values in Table 10 were calculated using $D_{65}$ illuminant, 10° observer

TABLE 10

Effects of UV exposure on Inks

| Ink/Substrate | % Initial Adhesion | Initial 60° gloss | % Retained 60° gloss | DE* | Visual Appearance |
|---|---|---|---|---|---|
| Jet 7537 | | | | | |
| 180-10 vinyl | 99 | 93.0 | 0.8 | 12.4 | Poor - microcracks visible |
| HI | 0 | 92.7 | 0.9 | 14.4 | Poor - ink chipped off in spots |
| DG | 0 | 93.3 | 1.5 | 13.2 | Poor - ink chipped off in spots |
| Ink 8 | | | | | |
| 180-10 vinyl | 100 | 90.7 | 37.9 | 18 | Fair - good - a few small scratches |
| HI | 95 | 89.6 | 41.9 | 19.5 | Fair - good - a few small scratches |
| DG | 20 | 91.8 | 36.8 | 19.6 | Fair - good - a few small scratches |

TABLE 8

Physical Properties of Process Color Inks

| Property | Ink 7a | Ink 7b | Ink 7c | Ink 7d |
|---|---|---|---|---|
| Reflectance Optical Density | 1.04 | 2.21 | 2.28 | 2.10 |
| Viscosity at 25° C. | 11.0 cP | 13.9 cP | 10.8 cP | 9.3 cP |

EXAMPLE 8

Ink 8 was prepared as in Example 2 from 25 parts Oligomer A, 21.7 parts THFFA, 12.6 parts EEEA, 12.6 parts IBOA, 2.5 parts HDDA, 10 parts NVC, 2.9 parts LAMPBLACK LB 101 pigment, 0.68 parts SOLSPERSE 32000, 2. parts TINUVIN 292, 0.1 parts IRGANOX 1035, 0.9 parts STABAXOL I, 0.2 parts COATOSIL 3573 flow agent, 3.76 parts IRGACURE 819, 2.5 parts IRGACURE 651, 1.26 parts IRGACURE 369 and 1 part IPTX Ink 8 was coated at 11 micrometers wet thickness using a #5 Meyer bar onto a 180-10 vinyl film, HI film, and DG film. These samples were compared to the commercially available curable inkjet: JET 7537 black UV inkjet ink obtained from Spectra Inc. of Hanover, N.H.

Each of the 180-10 vinyls with the cured ink layers was creased. The JET 7537 black UV inkjet ink cracked at the crease, while Ink 8 did not show any cracks.

Adhesion also was measured, and the results are shown in Table 9

TABLE 9

Adhesion of Cured Inks to Polymer Films

| | Adhesion to 180-10 vinyl | Adhesion to HI | Adhesion to DG |
|---|---|---|---|
| Ink 8 | 100% | 95% | 20% |
| Jet 7537 | 99% | 0% | 0% |

EXAMPLE 9

Elongation of inks of the present invention was measured and compared to comparable, commercially available inkjet inks.

Ink 9a was prepared as in Example 2 with the following formulation: 2 parts SUN BLACK predispersed pigment, 25 parts Oligomer B, 20 parts THFFA, 18 parts IBOA, 18 parts EEEA, 10 parts NVC, 2 parts TINUVIN 292, 3 parts IRGACURE 819, 2 parts IRGACURE 651, 0.5 parts IRGACURE 369 and 1 part IPTX.

Ink 9b was prepared as in Example 2 with the following formulation: 3 parts black Millbase 6d, 6.5 parts Oligomer B, 7 parts THFFA, 7 parts IBOA, 7 parts EEEA, 1.5 parts HDDA, 2.5 parts NVC, 0.6 parts TINUVIN 292, 0.9 parts IRGACURE 819, 0.6 parts IRGACURE 651, 0.15 parts IRGACURE 369 and 0.3 parts IPTX.

Ink 9a, Ink 9b, and Spectra Jet 7537 ink were coated onto SCOTCHCAL 180-10 vinyl film using a #8 Meyer bar (nominal wet thickness of 8 micrometers). The coated formulations were cured using two medium pressure mercury lamps under inert atmosphere at 200 mJ/cm².

Elongation of the cured samples was measured using a Material Test System Model 880 servohydraulic tester (MTS Systems Corp., Minneapolis, Minn.) and ASTM method D-3759. 1 inch wide samples were prepared and fixed at a 2 inch jaw separation. The sample was pulled at 12 inches/minute. Percent elongation was recorded at the break point or at the ink delamination point, whichever occurred first (Table 11).

TABLE 11

Elongation of Cured Inks

| Ink | Percent Elongation |
|---|---|
| Ink 9a | 170 |
| Ink 9b | 128 |
| Jet 7537 | 28 |

EXAMPLE 10

A morpholine adduct was prepared to use as a gloss promoting agent.

A partial vacuum (approximately 25 inches water vacuum) was pulled on a clean 1-Liter flask having an addition buret and stirring rod attached. The flask was preheated to 37.8° C.). Tetraethylene glycol diacrylate (256 g) was added to the flask with mixing at a moderate rate (approximately 70 rpm). The liquid was allowed to come up to temperature. Morpholine (155 g) was added to the flask at such a rate that the temperature did not exceed 46.1° C. The temperature control bath was set for 43.3° C. and the flask contents were mixed for 30 minutes. The vacuum on the flask was broken and the fluid reaction product (T-4 morpholine) was decanted through a 25 micron filter into a container.

EXAMPLE 11

Samples (A through E) were prepared for which the formulations of each were identical except that each included a different gloss promoting agent. The curing characteristics of the samples were determined. The formulations (in parts by weight solids) and results are shown in Table 12.

TABLE 12

| Component | A | B | C | D | E |
|---|---|---|---|---|---|
| IPTX | 1.00 | 1.00 | 1.00 | 1.00 | 1.00 |
| IRGACURE 369 | 3.00 | 3.00 | 3.00 | 3.00 | 3.00 |
| IRGACURE 651 | 3.00 | 3.00 | 3.00 | 3.00 | 3.00 |
| IRGACURE 819 | 5.00 | 5.00 | 5.00 | 5.00 | 5.00 |
| Isooctyl Acrylate | 20.00 | 20.00 | 20.00 | 20.00 | 20.00 |
| Isobornyl Acrylate | 10.00 | 10.00 | 10.00 | 10.00 | 10.00 |
| 1,6-hexanediol diacrylate | 5.00 | 5.00 | 5.00 | 5.00 | 5.00 |
| (Ethoxy, ethoxy)ethyl acrylate | 10.00 | 10.00 | 10.00 | 10.00 | 10.00 |
| Tetrahydrofurfuryl acrylate | 4.00 | 4.00 | 4.00 | 4.00 | 4.00 |
| Sartomer PRO-4303 | 24.00 | 24.00 | 24.00 | 24.00 | 24.00 |
| Black Millbase** | 10.00 | 10.00 | 10.00 | 10.00 | 10.00 |
| N-vinylcaprolactam | 5.00 | | | | |
| Sartomer CN386 | | 5.00 | | | |
| Sartomer CN381 | | | 5.00 | | |
| Sartomer CN383 | | | | 5.00 | |
| T-4 Morpholine Adduct | | | | | 5.00 |
| Viscosity at 25° C. | 14.04 cP | 15.33 cP | 15.88 cP | 14.42 cP | 16.82 cP |
| Surface Tack* | Slight | Slight | Slight | None | None |
| Through Cure* | Good | Good | Good | Good | Excellent |
| Mar Resistance* | Good | Very Poor | Very Poor | Poor | Very Good |
| Overall Cure Rating* | Good | Very Poor | Fair | Good | Excellent |

*Note: Samples were cured using 2 medium pressure Hg lamps. Peak intensity in UVA region of 500 mW/cm$^2$, dosage was 150 mJ/cm$^2$.
**Note: Black Millbase was 25 wt. % Pfizer Lampblack LB-1011, 5 wt. % SOLSPERSE 32000, 70 wt. % THFFA monomer.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A radiation curable, ink jettable fluid composition, comprising:
   (a) an oligo/resin component; and
   (b) a radiation curable reactive diluent, wherein the reactive diluent comprises
      a high Tg component,
      0.1 to 50 weight percent of an adhesion promoting component, wherein the adhesion promoting component comprises at least one of a heterocyclic radiation curable monomer and/or a monomer having a pendant alkoxylated moiety, and
      at least one multifunctional monomer having a plurality of radiation curable moieties,
      wherein the reactive diluent is free of monomers having three radiation curable moieties, is free of alkoxylated radiation curable monomers comprising main-chain alkoxylated functionality, and comprises 0.5 to 25 weight percent of multifunctional radiation curable materials,
      wherein the composition has an elongation of at least 50% in a cured state.

2. The radiation curable, ink jettable composition of claim 1, wherein the adhesion promoting component comprises a heterocyclic radiation curable monomer.

3. The radiation curable, ink jettable composition of claim 1, wherein the adhesion promoting component comprises a radiation curable monomer comprising a pendant alkoxylated moiety.

4. The ink composition of claim 1, wherein the oligo/resin component is aliphatic.

5. The ink composition of claim 1, wherein the oligo/resin component comprises an oligo/resin selected from the group consisting of an aliphatic polyester oligo/resin, an aliphatic polyurethane oligo/resin, and an aliphatic acrylic oligo/resin.

6. The ink jettable fluid composition of claim 1, wherein the composition is substantially free of solvent.

7. The ink jettable fluid composition of claim 1, wherein the reactive diluent comprises 0.5 to 50 weight percent of the high Tg component.

8. The ink jettable fluid composition of claim 7, wherein the high Tg component comprises a monomer, said monomer comprising at least one radiation curable moiety and at least one nonaromatic, cyclic moiety.

9. The ink jettable composition of claim 7, wherein the high Tg component comprises isobornyl (meth)acrylate.

10. The ink jettable composition of claim 7, wherein the adhesion promoting component comprises a monomer having an adhesion score after curing of at least 50 according to ASTM D 3359-95A, Method B on at least one substrate chosen from the group consisting of polymethyl methacrylate, polyvinyl chloride, and polyethylene terephthalate.

11. The ink jettable composition of claim 7, wherein the adhesion promoting component comprises a monomer, said monomer comprising at least one radiation curable moiety and pendant alkoxylated functionality.

12. The ink jettable composition of claim 7 wherein the adhesion promoting component comprises 2-(2-ethoxyethoxy)ethyl (meth)acrylate.

13. The ink jettable composition of claim 7, wherein the adhesion promoting component comprises a monomer, said monomer comprising at least one radiation curable moiety and at lease one heterocyclic moiety.

14. The ink jettable composition of claim 13, wherein said monomer is tetrahydrofurfuryl (meth)acrylate.

15. The composition of claim 7, wherein the adhesion promoting component comprises N-vinylcaprolactam.

16. The composition of claim 7, wherein the adhesion promoting component comprises propoxyethyl (meth)acrylate.

17. The ink jettable composition of claim 1, wherein the multifunctional monomer comprises hexanediol di(meth)acrylate.

18. The ink jettable composition of claim 1, wherein the adhesion promoting component comprises 1 to 10 parts by weight of a first monomer comprising at least one radiation curable moiety and pendant alkoxylated functionality per 5 to 15 parts by weight of a second monomer comprising at least one radiation curable moiety and at least one heterocyclic moiety.

19. The ink jettable composition of claim 18, wherein the first monomer is 2-(2-ethoxyethoxy)ethyl (meth)acrylate and the second monomer is tetrahydrofurfuryl (meth)acrylate.

20. The ink jettable fluid composition of claim 1, wherein the reactive diluent comprises isobornyl (meth)acrylate, tetrahydrofurfuryl (meth)acrylate, and hexanediol di(meth)acrylate.

21. The ink jettable fluid composition of claim 1, wherein the reactive diluent comprises 30-50 wt % isobornyl (meth)acrylate, 30-50 Wt % tetrahydrofurfuryl (meth)acrylate, and 5-15 wt % hexanediol di(meth)acrylate.

22. The ink jettable fluid composition of claim 1, wherein the oligo/resin component is an aliphatic urethane diacrylate.

23. The ink jettable fluid composition of claim 1, wherein the reactive diluent comprises 0.5 to 30 weight percent of the high Tg component.

24. A radiation curable, ink jettable fluid composition, comprising:
(a) an oligo/resin component; and
(b) a radiation curable reactive diluent, wherein the reactive diluent comprises a high Tg component, an adhesion promoting component, and at least one multifunctional monomer having a plurality of radiation curable moieties, wherein the adhesion promoting component comprises at least one of a heterocyclic radiation curable monomer, and/or a monomer comprising a pendant alkoxylated moiety, and wherein the fluid composition has a viscosity of up to about 50 centipoise at 25° C., is free of trifunctional monomers having a plurality of radiation curable moieties and is free of alkoxylated radiation curable monomers comprising main-chain alkoxylated functionality,
wherein the reactive diluent comprises 0.5 to 25 weight percent of multifunctional radiation curable materials, and
wherein the composition has an elongation of at least 50% in a cured state.

25. A radiation curable, inkjettable fluid composition, comprising:
(a) an oligo/resin component; and
(b) a radiation curable reactive diluent, wherein the reactive diluent comprises:
isobornyl (meth)acrylate;
tetrahydrofurfuryl (meth)acrylate, and
0.5 to 25 weight percent of hexanediol di(meth)acrylate;
wherein the reactive diluent is free of an alkoxylated, radiation curable monomer comprising main-chain alkoxylated functionality and is free of monomers having three radiation curable moieties; and
wherein the fluid composition has an elongation of at least 50% in a cured state.

26. The ink jettable fluid composition of claim 25, wherein the reactive diluent comprises 30-50 wt% isobornyl (meth)acrylate, 30-50 wt % tetrahydrofurfuryl (meth)acrylate, and 5-15 wt % hexanediol di(meth)acrylate.

27. The ink jettable fluid composition of claim 25, wherein the oligo/resin component is an aliphatic urethane diacrylate.

* * * * *

UNITED STATES PATENT AND TRADEMARK OFFICE
CERTIFICATE OF CORRECTION

PATENT NO.       : 7,423,072 B2
APPLICATION NO.  : 10/008235
DATED            : September 9, 2008
INVENTOR(S)      : Jennifer L. Lee It is certified that error appears in the above-identified patent and that said Letters Patent is hereby corrected as shown below:

Column 8,
Line 5, Delete "N.J.).;" and insert -- N.J.); --, therefor.
Line 10, Delete "CN964 B-85," and insert -- CN964B-85, --, therefor.
Line 12, Delete "CN 965," and insert -- CN965, --, therefor.
Line 14, Delete "(Akcross" and insert -- (Akcros --, therefor.
Line 35, After "bearing" insert -- Attorney Docket No. 55323 USA 5A, --.

Column 14,
Line 15, Delete "dinitranilines," and insert -- dinitroanilines, --, therefor.

Column 18,
Line 44, Delete "281.3 g" and insert -- 281.3g --, therefor.

Column 20,
Line 29, Delete "Gloss" and insert -- gloss --, therefor.
Line 51, Delete "ajar" and insert -- a jar --, therefor.

Column 21,
Line 42, Delete "Getting" and insert -- (jetting --, therefor.

Column 23,
Line 14, Delete "4000 h" and insert -- 4000h --, therefor.

Column 24,
Line 15, Delete "Missisaugua," and insert -- Mississauga, --, therefor.

Column 27,
Line 46, After "IPTX" insert -- . --.
Line 57, After "Table 9" insert -- . --.

Column 28,
Line 4, After "observer" insert -- . --.

Column 31,
Line 44, In Claim 21, delete "Wt %" and insert -- wt % --, therefor.

UNITED STATES PATENT AND TRADEMARK OFFICE
CERTIFICATE OF CORRECTION

PATENT NO.        : 7,423,072 B2
APPLICATION NO.   : 10/008235
DATED             : September 9, 2008
INVENTOR(S)       : Jennifer L. Lee It is certified that error appears in the above-identified patent and that said Letters Patent is hereby corrected as shown below:

Column 32,
Line 25 (approx..), In Claim 25, delete "inkjettable" and insert -- ink jettable --, therefor.
Line 41, In Claim 26, delete "wt%" and insert -- wt % --, therefor.

Signed and Sealed this

Seventeenth Day of March, 2009

JOHN DOLL
*Acting Director of the United States Patent and Trademark Office*